(12) United States Patent
Shiraishi

(10) Patent No.: US 7,880,938 B2
(45) Date of Patent: Feb. 1, 2011

(54) IMAGE PROCESSING APPARATUS

(75) Inventor: Mitsuo Shiraishi, Ushiku (JP)

(73) Assignee: Canon Kabushiki Kaisha (JP)

( * ) Notice: Subject to any disclaimer, the term of this patent is extended or adjusted under 35 U.S.C. 154(b) by 973 days.

(21) Appl. No.: 11/696,176

(22) Filed: Apr. 3, 2007

(65) Prior Publication Data
US 2007/0236748 A1 Oct. 11, 2007

(30) Foreign Application Priority Data
Apr. 10, 2006 (JP) .............................. 2006-108042

(51) Int. Cl.
H04N 1/04 (2006.01)
(52) U.S. Cl. ..................... 358/474; 358/3.28; 358/1.9; 358/1.2; 347/116; 399/49; 382/162
(58) Field of Classification Search .............. 358/3.28, 358/1.14, 518, 1.9, 520, 505, 504, 1.15, 474, 358/1.2; 399/302, 88, 72, 49; 347/116, 131; 382/162, 167
See application file for complete search history.

(56) References Cited

U.S. PATENT DOCUMENTS

| | | | | |
|---|---|---|---|---|
| 5,068,913 | A * | 11/1991 | Sugiura ........................ | 382/175 |
| 5,329,339 | A * | 7/1994 | Sakamoto et al. .............. | 399/55 |
| 5,373,355 | A * | 12/1994 | Ando et al. ................... | 399/301 |
| 6,064,838 | A * | 5/2000 | Maruta et al. ................... | 399/79 |
| 6,181,356 | B1 * | 1/2001 | Ohnishi et al. ............... | 347/116 |
| 6,411,363 | B1 * | 6/2002 | Kamada et al. ................ | 355/52 |
| 6,516,157 | B1 * | 2/2003 | Maruta et al. ................... | 399/8 |
| 7,139,087 | B2 * | 11/2006 | Hayashi ...................... | 358/1.15 |
| 7,385,737 | B2 * | 6/2008 | Zaima ......................... | 358/504 |
| 7,477,426 | B2 * | 1/2009 | Guan et al. .................. | 358/474 |
| 7,599,099 | B2 * | 10/2009 | Tamaru ...................... | 358/3.28 |
| 7,684,715 | B2 * | 3/2010 | Zaima ......................... | 399/27 |
| 2002/0149799 | A1 * | 10/2002 | Hayashi ...................... | 358/406 |
| 2003/0128381 | A1 * | 7/2003 | Zaima ......................... | 358/1.9 |
| 2006/0164505 | A1 * | 7/2006 | Maeda ........................ | 347/234 |
| 2006/0164700 | A1 * | 7/2006 | Hayashi ...................... | 358/518 |
| 2007/0188775 | A1 * | 8/2007 | Minamino ................... | 358/1.6 |
| 2007/0201894 | A1 * | 8/2007 | Kishi et al. ................... | 399/88 |

FOREIGN PATENT DOCUMENTS

JP 2005-151456 A 6/2005

* cited by examiner

*Primary Examiner*—Negussie Worku
(74) *Attorney, Agent, or Firm*—Rossi, Kimms & McDowell LLP

(57) ABSTRACT

An image processing apparatus that enables to embed a secure pattern code in an output image with an inexpensive configuration. An image reader has a color reference plate and reads image data of an original. An image forming apparatus forms an image on an image carrier based on the image data of the original. A laser controller irradiates the color reference plate with laser light. An image sensor controller reads a pattern image generated by irradiating the color reference plate with the laser light. The image forming apparatus adds data concerning the pattern image read by the image sensor controller to the image data of the original read by the image reader and forms an image based on the image data of the original to which the data concerning the pattern image is added.

13 Claims, 14 Drawing Sheets

FIG. 6

|    | 1  | 2  | 3  | 4  | 5  | 6  | 7 | 8 | 9 | 10 | 11 | 12 | 13 | 14 |
|----|----|----|----|----|----|----|---|---|---|----|----|----|----|----|
| 1  | a0 | b0 | c0 | a1 | b1 | c1 |   |   |   |    |    |    |    |    |
| 2  | d0 | e0 | f0 | d1 | e1 | f1 |   |   |   |    |    |    |    |    |
| 3  | g0 | h0 | i0 | g1 | h1 | i1 |   |   |   |    |    |    |    |    |
| 4  | a2 | b2 | c2 | a3 | b3 | c3 |   |   |   |    |    |    |    |    |
| 5  | d2 | e2 | f2 | d3 | e3 | f3 |   |   |   |    |    |    |    |    |
| 6  | g2 | h2 | i2 | g3 | h3 | i3 |   |   |   |    |    |    |    |    |
| 7  |    |    |    |    |    |    |   |   |   |    |    |    |    |    |
| 8  |    |    |    |    |    |    |   |   |   |    |    |    |    |    |
| 9  |    |    |    |    |    |    |   |   |   |    |    |    |    |    |
| 10 |    |    |    |    |    |    |   |   |   |    |    |    |    |    |
| 11 |    |    |    |    |    |    |   |   |   |    |    |    |    |    |
| 12 |    |    |    |    |    |    |   |   |   |    |    |    |    |    |
| 13 |    |    |    |    |    |    |   |   |   |    |    |    |    |    |
| 14 |    |    |    |    |    |    |   |   |   |    |    |    |    |    |

FIG. 10C

IMAGE PROCESSING APPARATUS

BACKGROUND OF THE INVENTION

1. Field of the Invention

The present invention relates to an image processing apparatus, and more particularly, to an image processing apparatus which has a copying function and embeds a tracking code in an output image.

2. Description of the Related Art

Color copying machines (hereinafter simply referred to as "copying machines") are capable of embedding a tracking code known as a pattern code in the output image. The pattern code is generated as follows. A unique code assigned to each individual model of copying machine that outputs an image is converted into dot data in accordance with a certain encryption rule and an image hidden in the output image, a pattern code, is generated on the dot data. The pattern code is made up of fine, faint color dots generated using yellow toner and is hardly visible in an output image to the naked eye (see Japanese Laid-Open Patent Publication No. 2005-151456, for example).

A pattern code embedded in an output image can be read by using an image reader such as a scanner capable of reading pattern codes to track back to identify the model of copying machine that outputted the image.

However, with the conventional technique, only the model of copying machine that outputted an image can be identified by reading a pattern code embedded in the output image. It is impossible to identify with this technique which of the copying machines of the same model outputted the image. To make it possible to track each individual copying machine by reading a pattern code, every individual copying machine must have a unique pattern code. To generate such unique pattern codes, every individual copying machine must have a code associated with the machine and a memory adapted to store the code in it. In addition, the code and the pattern code must be managed in such a manner that they match each other. Generating a unique pattern code for every individual copying machine is not practical because of operational costs. Therefore, a given pattern code for copying machines of the same model is generated and embedded in output images to provide traceability. However, it is difficult to trace back to identify the copying machine that formed an output image among the machines of the same model using the pattern code of the model.

Furthermore, since pattern codes are generated from unique codes assigned to copying machines in accordance with a certain encryption rule, they can be forged by decrypting the unique codes and the encryption rule.

SUMMARY OF THE INVENTION

The present invention provides an image processing apparatus capable of embedding a secure pattern code in an output image with an inexpensive configuration.

Accordingly, according to a first aspect of the present invention, there is provided an image processing apparatus comprising an image reader having a reference plate and adapted to read image data of an original, an image forming section adapted to form an image on an image carrier based on the image data of the original, an irradiating section adapted to irradiate the reference plate with light, and a reading section adapted to read a pattern image generated by irradiating the reference plate with the light, wherein the image forming section adds data concerning the pattern image read by the reading section to the image data of the original read by the image reader and forms an image based on the image data of the original to which the data concerning the pattern image is added.

Accordingly, according to a second aspect of the present invention, there is provided an image processing apparatus comprising an image reader having a reference plate and adapted to read image data of an original, an image forming section adapted to form a color image on an image carrier based on the image data of the original, an irradiating section adapted to irradiate the reference plate with light, and a reading section adapted to read data on a pattern image of scattering light generated by irradiating the reference plate with the light, wherein the image forming section adds the data on the pattern image to the image data of the original and forms the color image based on image data of the original to which the data on the pattern image is added.

According to the present invention, a reference plate is irradiated with light, image data of a pattern of scattering light generated by the irradiation is added to an image data of an original, and an output image is formed based on the image data of the original to which the image data of the pattern is added. The patterns of the scattering light vary from reference plate to plate. Therefore, by using an image reader capable of reading image data of a pattern which is added as a pattern code to image data of an original, the copying machine that outputted the image can be identified. Because the pattern code can be thus embedded in an output image without needing to provide in each individual copying machine a code associated with the copying machine and a memory adapted to store the code, the costs can be saved. Moreover, since generation of the pattern code is not based on an encryption rule, the pattern code cannot be decrypted or forged.

The above and other objects, features, and advantages of the invention will become more apparent from the following detailed description taken in conjunction with the accompanying with drawings.

BRIEF DESCRIPTION OF THE DRAWINGS

FIG. 6 is a diagram showing an example of an image of a laser speckle pattern read at step S403 in the image processing illustrated in FIG. 4.

FIG. 9 is a diagram illustrating address allocation in a laser speckle pattern image subjected to the dispersing process shown in FIG. 8.

FIGS. 10A to 10I are diagrams illustrating address allocation in a laser speckle pattern image subjected to the dispersing process shown in FIG. 8.

DETAILED DESCRIPTION OF THE PREFERRED EMBODIMENTS

Embodiments of the present invention will be described with reference to the accompanying drawings.

Figure 1:
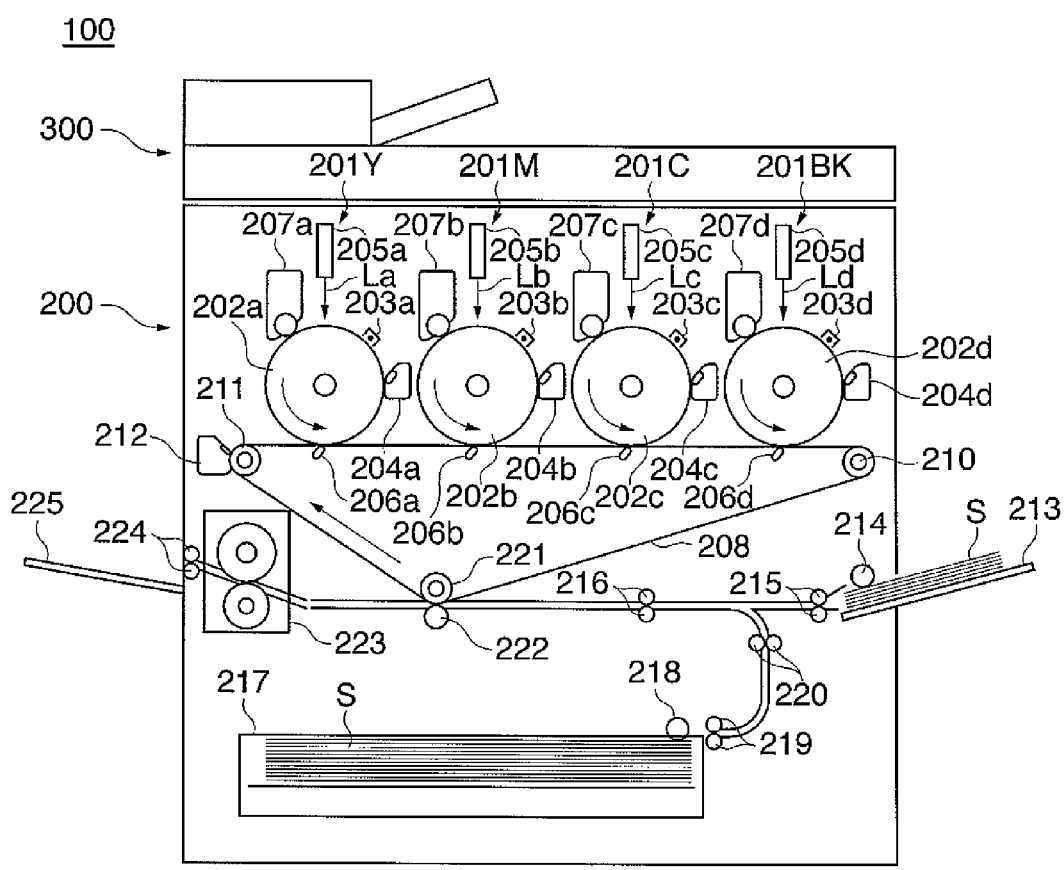
FIG. 1 is a diagram schematically showing a configuration of an image processing apparatus according to an embodiment of the present invention and, more particularly, schematically showing a major portion of an image forming apparatus.

FIG. 1 is a diagram schematically showing a configuration of an image processing apparatus according to an embodiment and, more particularly, is a diagram schematically showing a configuration of a major portion of an image forming apparatus in FIG. 2 described below.

The image processing apparatus 100 in FIG. 1 includes an image forming apparatus 200 which uses a tandem multi-transfer system and an image reader 300 disposed on the image forming apparatus 200 and having a laser speckle pattern reading unit 310.

The image forming apparatus 200 includes image forming units 201Y, 201M, 201C, and 201BK corresponding to yellow, magenta, cyan, and black, respectively, as shown in FIG. 1. Each of the image forming units 201Y, 201M, 201C, and 201BK has a photoconductive drum 202a-202d, a charger unit 203a-203d, and a cleaner 204a-204d. Each of the image forming units 201Y, 201M, 201C, and 201BK has a laser scanning unit 205a-205d, a transfer blade 206a-206d, and a developing unit 207a-207d.

The image forming apparatus 200 also includes an intermediate transfer belt 208, rollers 210, 211 which support the intermediate belt 208, and an intermediate transfer belt cleaner 212. The image forming apparatus 200 also includes a manual paper feed tray 213 and a paper feed cassette 217 containing paper sheets S, pickup rollers 214, 215, 218, 219 which pickup paper sheets S, a fusing unit 223, and a catch tray 225. The image forming apparatus 200 also includes a vertical path roller 220, a registration roller 216, rotation roller 221, a secondary transfer roller 222, and a paper eject roller 224.

The surface of each photoconductive drum 202a-202d is charge to a uniform electric potential by the charger unit 203a-203d and is then scanned by its associated laser scan unit 205a-205d and exposed to a laser beam La-Ld according to image data. As a result, an electrostatic latent image according to the image data is formed on the surface of each photoconductive drum 202a-202d. The electrostatic latent image formed on the surface of each photoconductive drum 202a-202d is visualized as a toner image of a corresponding color component by toner supplied from the associated developing unit 207a-207d.

The toner images formed on the photoconductive drums 202a-202d are sequentially transferred to the intermediate transfer belt 208 and superimposed one another (this transfer is hereinafter referred to as "primary transfer"). As a result, a color toner image is formed on the intermediate transfer belt 208 and is carried by the intermediate transfer belt 208. The color toner image carried by the intermediate transfer belt 208 is transferred onto a paper sheet S between the rotation roller 221 and the secondary transfer roller 222.

On the other hand, a paper sheet S is fed from the manual feed tray 213 or the paper feed cassette 217 and transported to the secondary transfer roller 222 with registration timing provided by the registration roller 216. The feeding components such as the pickup rollers 214, 215, 218, 219, the vertical path roller 220, and the registration roller 216 that transport paper sheets are individually driven by independent stepping motors (not shown) in order to achieve a fast, stable feeding operation.

The paper sheet S on which the color toner image has been transferred is fed to the fusing unit 223. The fusing unit 223 applies heat and pressure to the paper sheet S to fuse the color toner image to the paper sheet S. Thus, a permanent color image is formed on the paper sheet S. The paper sheet S is then ejected onto the catch tray 225 by the eject roller 224.

Toner can remain on the surface of the photoconductive drums 202a-202d after primary transfer to the intermediate transfer belt 208. The residual toner is scraped off and collected by their respective cleaners 204a-204d. Residual toner on the intermediate transfer belt 208 is scraped off and collected by the intermediate transfer belt cleaner 212.

The image reader 300 has a feeder (not shown) which feeds originals onto a platen glass 302 (FIG. 2) one by one and the platen glass 302 on which a fed original is placed. The image reader 300 further includes an original irradiating lamp (not shown) which irradiates an original with light, and an image sensor (not shown) such as a CCD which reads light reflected from the original.

Provided on the platen glass 302 is a white plate 304 (FIG. 2) as a color reference plate used as a reference for colors of an image. A correction value for correcting the color tone of a scanned image is determined by measuring the amount of light reflected from the white plate 304.

The image reader 300 also has a laser speckle pattern reading unit 310 (FIG. 2) which irradiates the white plate 304 with a laser beam and receives light reflected from the white plate 304.

A configuration and operation of the laser speckle pattern reading unit 310 of the image reader 300 according to the embodiment will be described below.

Figure 2:
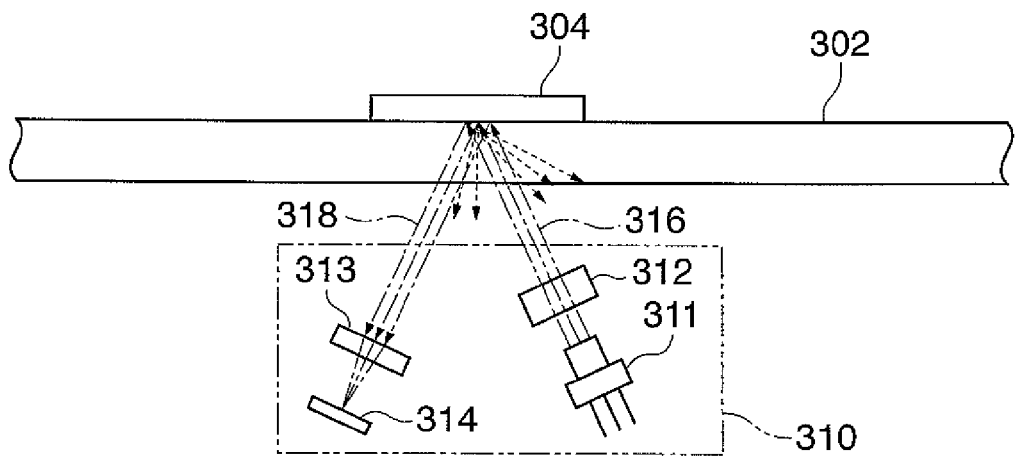
FIG. 2 is a diagram schematically showing a configuration of a feature portion of an image reader shown in FIG. 1.

FIG. 2 is a diagram schematically showing a configuration of a feature portion of the image reader 300 shown in FIG. 1.

The image reader 300 in FIG. 2 includes a platen glass 302 and a laser speckle pattern reading unit 310. Provided on the platen glass 302 is a white plate 304 used as a color reference plate.

The laser speckle pattern reading unit 310 includes a laser light source 311 (irradiating section), a collimator lens 312, an imaging lens 313, and an image sensor 314 (reading section), and irradiates the white plate 304 with laser light 316 and receives a reflected light 318 from the white plate 304. The laser speckle pattern reading unit 310 has a mechanism that moves the laser speckle pattern reading unit 310 to a position from where the white plate can be irradiated with laser light 316 when the white plate 304 is to be irradiated with the laser light 316, and retracts the laser speckle pattern reading unit 310 from the position when the white plate 304 does not need to be irradiated with laser light 316.

The laser light 316 applied from the laser speckle pattern reading unit 310 is a parallel light beam produced by passing a laser beam emitted from the laser light source 311 through the collimator lens 312. The laser light 316 applied to the white plate 304 through the platen glass 302 is transformed to a reflected light 318 having a unique interference pattern known as a laser speckle pattern, which will be described later, created when the laser light 316 is reflected off microscopic asperities on the surface of the white plate 304 that were produced during manufacturing of the white plate 304. The reflected light 318 from the white plate 304 enters the image sensor 314 through the imaging lens 313. The image sensor 314 reads the laser speckle pattern of the reflected light 318. The image sensor 314 in the embodiment is implemented by a two-dimensional image sensor such as a CCD or CMOS area sensor that has a wavelength sensitivity capable of sensing the wavelength of the laser beam.

A laser speckle pattern in general is an interference pattern observed when interference patterns are mutually intensified or weakened due to scattering of laser light. The laser speckle pattern is observed as random speckles (small spots) because it is created when laser light which is coherent light having a uniform wavelength and phase is reflected off points on a surface of an object that has microscopic asperities and waves of the reflected light with randomly different phases mutually interfere.

The interference pattern of a laser speckle pattern observed in the embodiment is a light and dark patterns of micro dots. The size of each dot is typically represented by a function of a number of device parameters such as the wavelength of laser light, the diameter of the laser beam, and the distance from a reflecting surface to an image sensor. If these device parameters are held constant, it is possible to assume that the width of each dot is a statistical average that is determined by the configuration of the laser speckle pattern reading unit. The assumption is not limited to the width of a dot; it can also be applied to other appropriate parameters such as the length of a dot, the distance between dots, the distance between the front edges of two adjacent dots, or the distance between the back edges of two adjacent dots. It is known that the average dot size is $$\text{average dot size} = \lambda \cdot R/d \quad (1)$$

Here, $\lambda$ is the wavelength of laser light, R is the distance from the reflecting surface, and d is the diameter of the laser beam.

As represented by Equation (1), a dot having a Gaussian average of 5 to 10 micrometers can be produced by strictly limiting the laser light source that emits laser light. That is, the distribution of dots in the laser speckle pattern of light reflected off the surface of the white plate having microscopic asperities produced during manufacturing can be clearly observed. On the other hand, the image sensor requires a sufficient number of scan pixels for observing the distribution of dots. If the size of a dot read by the image sensor cannot be made small, lenses for enlarging reflected light are added before and after the imaging lens to enlarge the reflected light before the light enters the image sensor.

Figure 3:
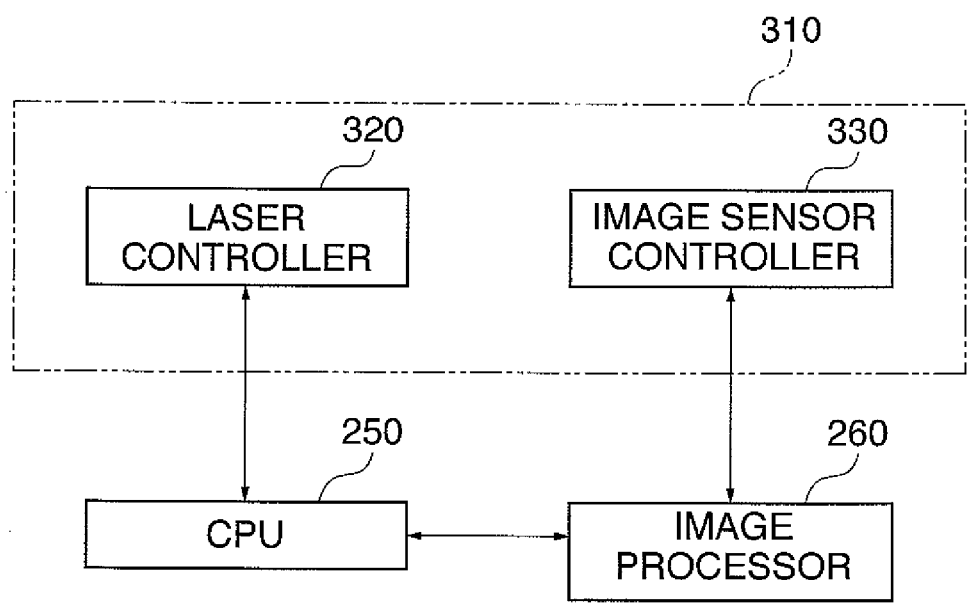
FIG. 3 is a block diagram schematically showing a configuration of a control section of the image processing apparatus shown in FIG. 1 and, more particularly, is a block diagram schematically showing a configuration of a control section of a laser speckle pattern reading unit shown in FIG. 2.

FIG. 3 is a block diagram schematically showing a configuration of a control section of the image processing apparatus 100 shown in FIG. 1 and, more particularly, schematically showing a configuration of a control section of the laser speckle pattern reading unit shown in FIG. 2.

As shown in FIG. 3, the laser speckle pattern reading unit 310 includes a laser controller 320 (irradiating section) which controls laser light emitted from the laser light source 311 and an image sensor controller 330 (reading section) which reads reflected light 318 entering the image sensor 314 to obtain image data.

The laser controller 320 controls on and off of laser irradiation in response to an instruction from a CPU 250 of the image forming apparatus 200. The laser controller 320 also obtains and monitors a predetermined output from a photodiode (not shown) provided in the laser light source 311 to adjust the current for laser light emitted from the laser light source 311 in order to keep the laser light constant.

The CPU 250 instructs an image processor 260 to read an image from the image sensor controller 330. The image processor 260 obtains image data of a laser speckle pattern obtained by the image sensor controller 330. Timing at which the image processor 260 obtains image data from the image sensor controller 330 is controlled by an instruction from the CPU 250. The image processor 260 processes the image data obtained from the image sensor controller 330 to binarize the laser speckle pattern, line by line of scan pixels of the image sensor 314 and stores the binarized laser speckle pattern image data in a memory (not shown).

Figure 4:
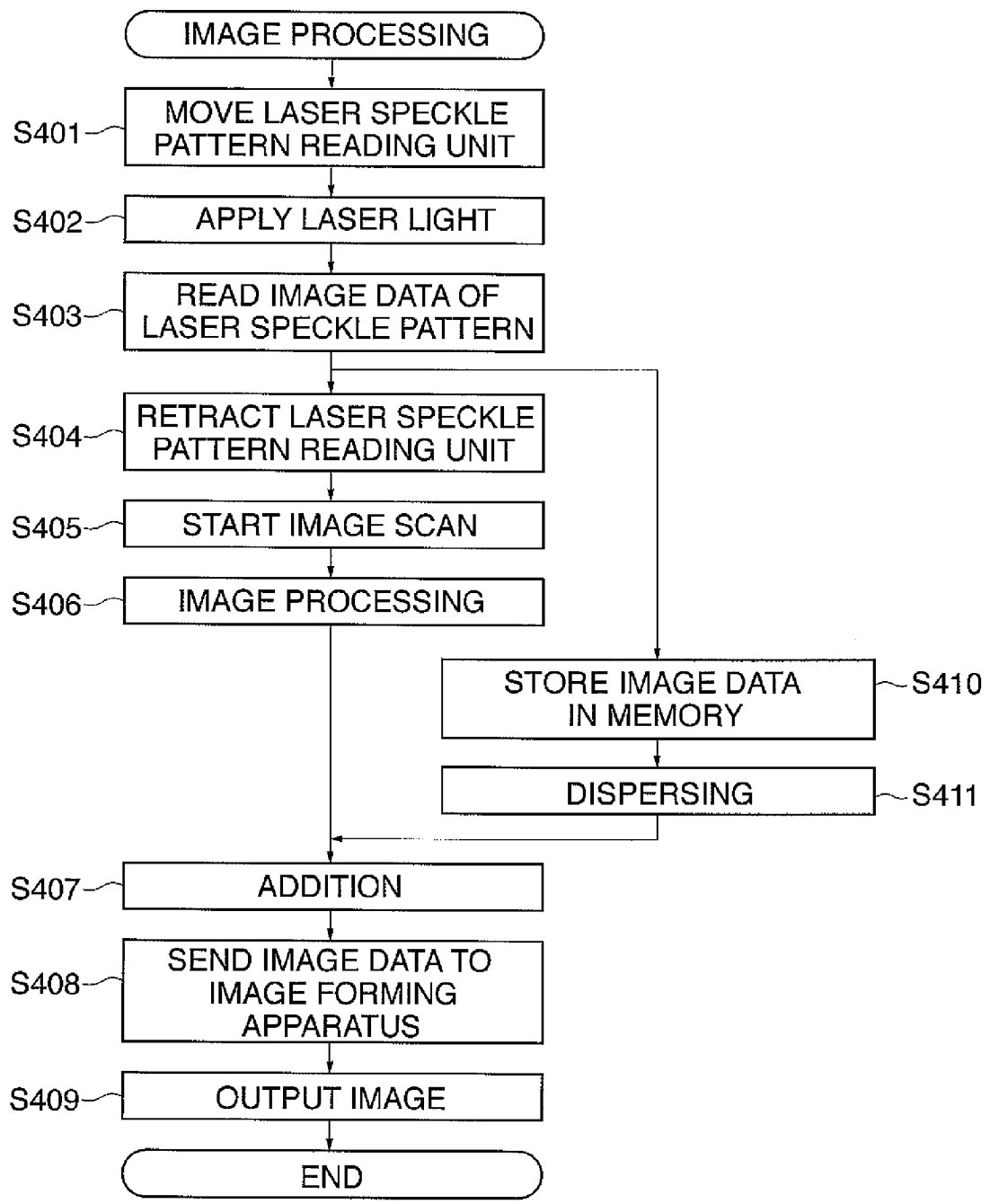
FIG. 4 is a flowchart of a procedure of image processing performed by the image processing apparatus shown in FIG. 1.

FIG. 4 is a flowchart showing a procedure of image processing performed in the image processing apparatus 100 shown in FIG. 1.

The process shown in FIG. 4 is performed by the CPU 250 in the image forming apparatus 200.

In FIG. 4, when a command to start full color copying is issued by a user by depressing a copying button, for example, the laser speckle pattern reading unit 310 first moves to a position from where the white plate 304 can be irradiated with laser light 316 (step S401).

Then, the laser speckle pattern reading unit 310 irradiates the white plate 304 with laser light 316 (step S402) and receives light 318 reflected from the white plate 304 which has a laser speckle pattern. The laser speckle pattern reading unit 310 then reads image data of the laser speckle pattern of the reflected light 318 (step S403).

Then, the laser speckle pattern reading unit 310 is retracted from the irradiation position (step S404). The image reader 300 starts reading image data from the original (step S405) and applies predetermined image processing to the image data (step S406).

On the other hand, binarization is applied to the image data of the laser speckle pattern read at step S403 as described above and the binarized image data is temporarily stored in a memory (step S410). Then, the image data of the laser speckle pattern is retrieved from the memory and a dispersing process shown in FIG. 7, which will be described later, is applied to the image data to convert it into low-dot-density image data (step S411).

The image data subjected to the image processing at step S406 and the image data subjected to the dispersing process at step S411 are added together (step S407). In the adding process at step S407, the image data subjected to the dispersing process is added to yellow image data in the image data subjected to the image processing. The image data subjected to the adding process is sent to the image forming apparatus 200 (step S408), where an image based on the sent image data is output (step S409), and then the process will end.

In the image processing shown in FIG. 4, image data of the laser speckle pattern shown in FIG. 6, which will be described later, of the light 318 reflected from the white plate 304 is read (step S403), and the image data of the laser speckle pattern to which the dispersing process has been applied is added to image data of an original (step S407). Thus, a pattern code unique to the image forming apparatus can be embedded because the laser speckle pattern of the reflected light 318 is unique to each white plate. Since the pattern code unique to the image forming apparatus can be embedded without needing for providing in the image forming apparatus a code associated with the image forming apparatus and a memory for the code, the costs can be saved. The laser speckle pattern is difficult to decipher or create, the pattern code cannot be forged.

Conventionally, a white panel 304 provided on a platen glass 302 as a color reference plate is managed by providing a barcode on the platen glass 30 separately from the white plate 304 and reading the barcode. According to the present embodiment of the invention, image data of a laser speckle pattern unique to each white plate can be read, therefore the image data can be used to manage the white plate. Accordingly, a barcode for managing the white plate is not required and the cost can be saved.

Figure 5:
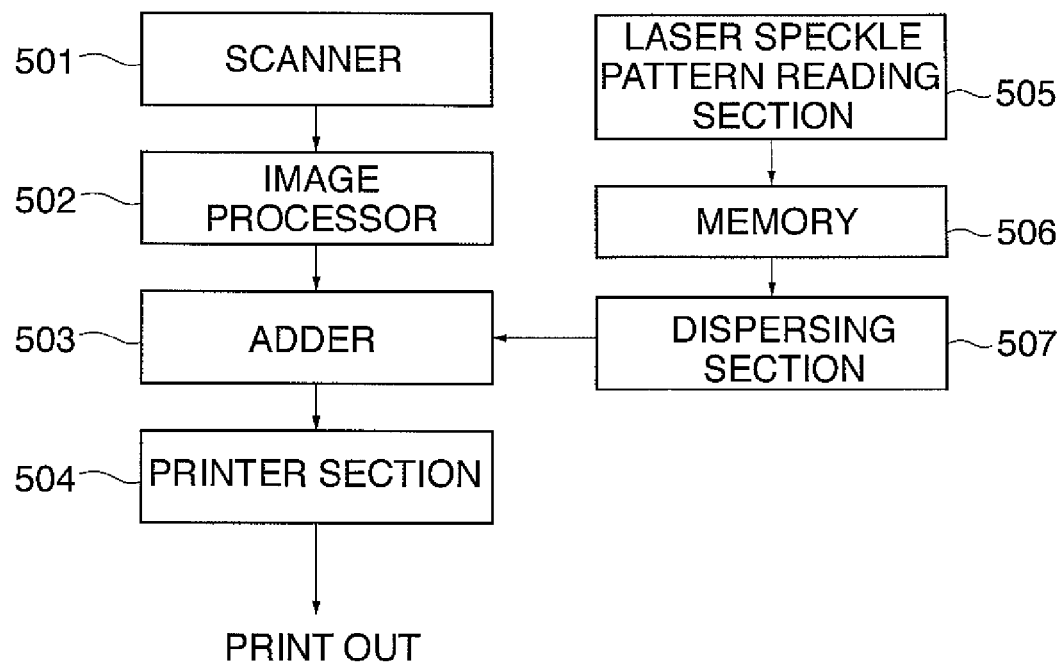
FIG. 5 is a diagram showing a flow of image data processed in the image processing illustrated in FIG. 4.

FIG. 5 is a diagram showing a flow of image data processed in the image processing illustrated in FIG. 4.

In FIG. 5, image data of a laser speckle pattern is first obtained at a laser speckle pattern reading section 505. Then the image data of the laser speckle pattern is held and stored in a memory 506. On the other hand, a scanner section 501 obtains image data of an original. Then, an image processor 502 applies image processing to the image data of the original, such as adjustment of colors and density. Here, the image data consisting of three colors, R (red), G (green), and B (blue), is converted to image data consisting of four colors, Y (yellow), M (magenta), C (cyan), and BK (black). The image data of the original converted into four colors, Y, M, C, and BK, is sent to an adding section 503. On the other hand, the image data of the laser speckle pattern held and stored in the memory 506 is sent to a dispersing section 507, where a dispersing process is applied to the image data of the laser speckle pattern to transform it to dot image data. The adding section 503 adds the image data converted in the dispersing section 507 to the Y data in the image data sent from the image processor 502 and sends the resulting image data to a printer section 504. The printer section 504 forms and prints out a full color image based on the image data it has received.

The dispersing process applied to the image data of a laser speckle pattern mentioned above will be described below.

FIG. 6 is a diagram showing an image of a laser speckle pattern read at step S403 of the image processing shown in FIG. 4.

The image shown in FIG. 6 is produced by applying binarization to the image data of the laser speckle pattern read by the image sensor 314.

While the laser speckle pattern shown in FIG. 6 has been read from a 14×14 pixel area in the image sensor 314, the area is not limited to this. An area of a larger number of pixels can be read.

Figure 7:
FIG. 7 is a diagram illustrating a dispersing process performed at step S411 of the image processing shown in FIG. 4.

FIG. 7 is a diagram illustrating the dispersing process performed at step S411 of the image processing shown in FIG. 4.

The image shown in FIG. 7 can also be produced by applying binarization to a laser speckle pattern read by the image sensor 314.

When image data of a laser speckle pattern is added to image data of an original at step S407 of the image processing described above and shown in FIG. 4, yellow image data of the laser speckle pattern is added to the image data of the original because yellow is less perceptible to the human eye so that the visual quality of an output image is prevented from significantly degraded. However, although yellow dots are less perceptible to the human eye, areas where yellow dots are densely arranged are visible to the human eye. Therefore, in the present embodiment, dots in laser speckle pattern are dispersed to create low-dot-density image data and the low-dot-density image data is added to image data of an original, instead of directly adding image data of the laser speckle pattern. The result is that the image data of the laser speckle pattern added to the image data of the original is imperceptible to users. Thus, the degradation of visual quality of the output image can be prevented.

Referring to FIG. 7, a basic principle of the dispersing process will be described with respect to a laser speckle pattern read in an area of 3×3 pixels in the image sensor 314 will be described below.

As shown in FIG. 7, addresses 1, 2, 3, . . . , 9 are assigned to the pixels in an image of a laser speckle pattern read in a 3×3 pixel area. Then the image is enlarged to an image consisting of 9×9 pixels to disperse the dots in the laser speckle pattern. Here, addresses 1, 2, 3, . . . , 9 are assigned to pixel positions in the 9×9 pixel image shown in FIG. 7 beforehand correspondently to the addresses 1, 2, 3, . . . , 9 given above, and then the pixels of the 3×3 pixel image are allocated to their corresponding addresses. The addresses assigned to the pixel positions of the dispersed image shown in FIG. 7 are only illustrative. Pixels may be allocated to any positions.

Figure 8:
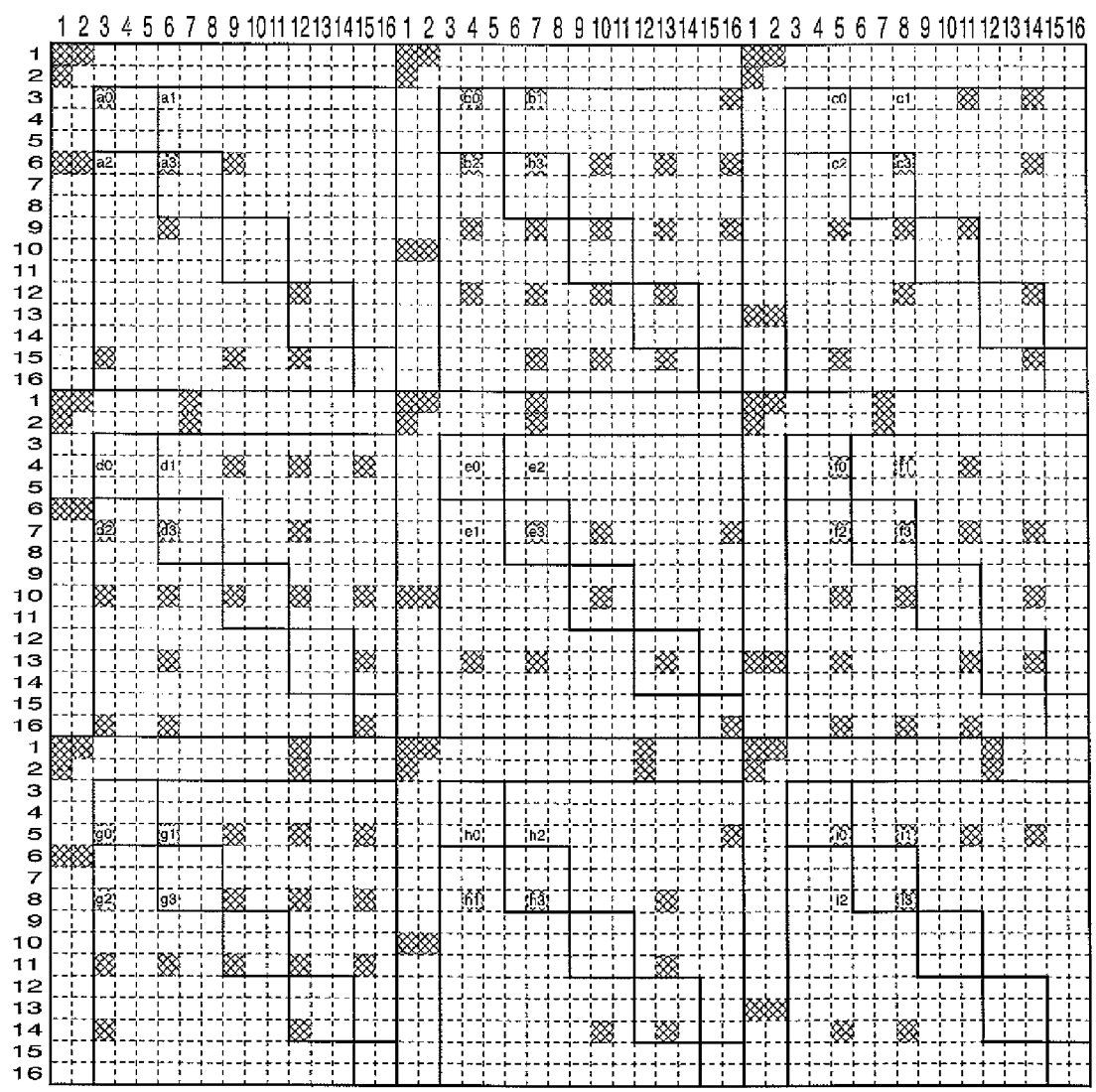
FIG. 8 is a diagram showing an example of an image generated by applying the dispersing process to the image of the speckle pattern shown in FIG. 6.

FIG. 8 is a diagram showing an example of an image produced by applying dispersing to the image of the laser speckle pattern shown in FIG. 6 based on the principle of the dispersing described above.

With respect to the example in FIG. 8, dispersing is applied to the 14×14 pixel image shown in FIG. 6 to produce a 48×48 pixel image. The image of the laser speckle pattern shown in FIG. 6 is divided into 3×3 pixel areas, and addresses a0-i0, a1-i1, a2-i2, a3-i3, and so on are assigned to the areas. Addresses corresponding to these addresses are assigned to positions in the 48×48 pixel image shown in FIG. 8 beforehand and then the pixels of the 14×14 pixel image are allocated to positions with the corresponding addresses in the 48×48 pixel image.

Address assignment to the image generated by the dispersing process in FIG. 8 will be further detailed below.

The 48×48 pixel image in FIG. 8 is divided into nine 16×16 pixel areas. Then, pixel areas 1 and 2 along the vertical axis and pixel areas 1 and 2 along the horizontal axis in a 16×16 pixel area are assigned addresses indicating which of the nine areas in the 48×48 pixel area corresponds to the 16×16 pixel areas. This will be detailed with reference to FIGS. 9 and 10.

Figure 9:
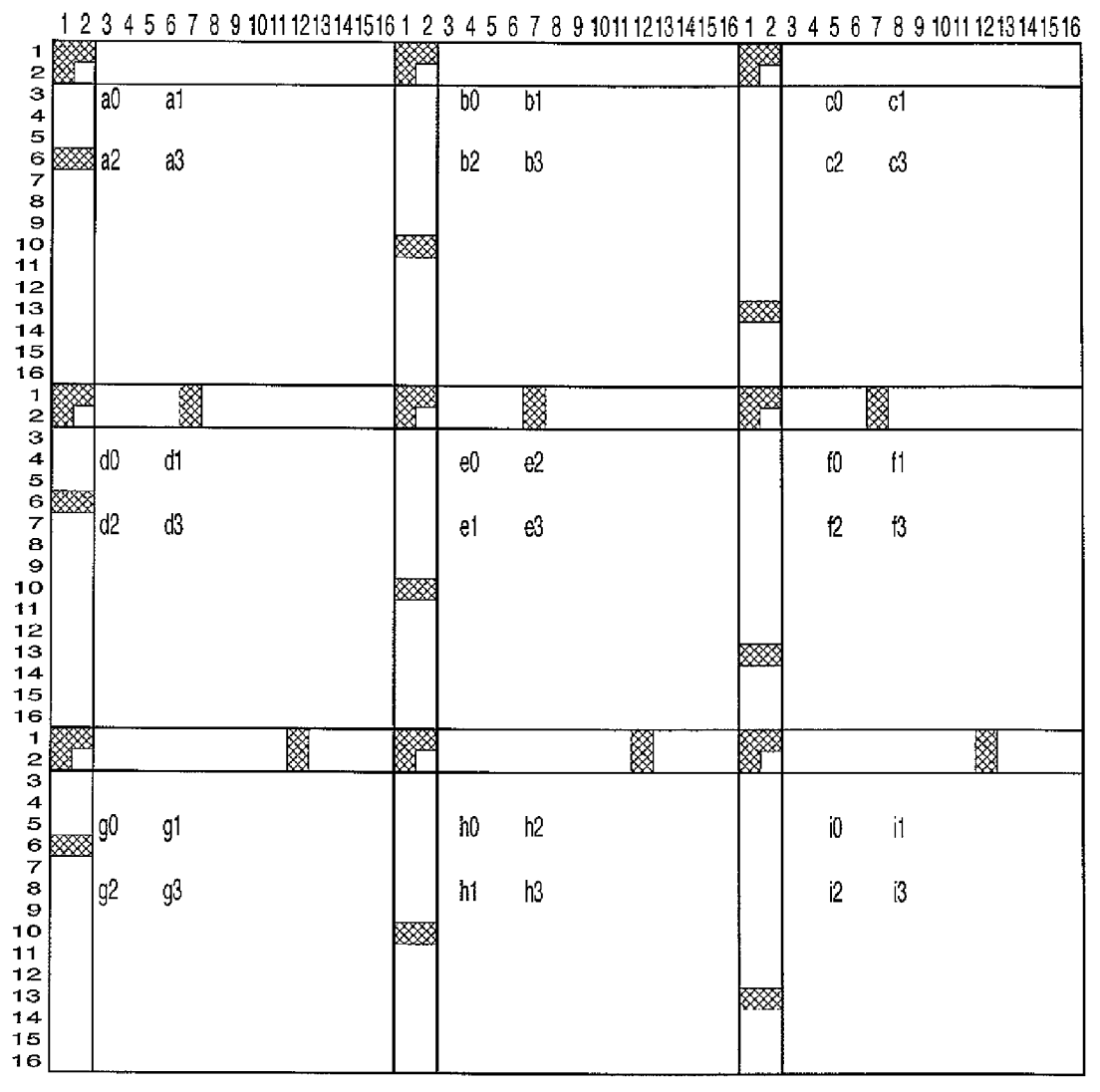

As shown in FIG. 9, the 48×48 pixel image is divided into nine 16×16 pixel areas. Then, pixel areas 1 and 2 along the vertical axis and pixel areas 1 and 2 along the horizontal axis in each 16×16 pixel area are assigned addresses indicating which of the nine areas of the 48×48 pixel image corresponds to the 16×16 pixel area. First, allocated to the 16×16 pixel area at the top left corner are pixels indicated with a in the 14×14 pixel image shown in FIG. 6. Allocated to the 16×16 pixel area at the top middle are pixels indicated with b in the 14×14 pixel image shown in FIG. 6, allocated to the 16×16 pixel area at the top right corner are pixels indicated with c in the 14×14 pixel images shown in FIG. 6, and so on.

Referring to FIGS. 10A to 10I, how the addresses of areas are indicated using the two left most columns and the two top rows will be described below.

Figures 10A, 10B, 10C:
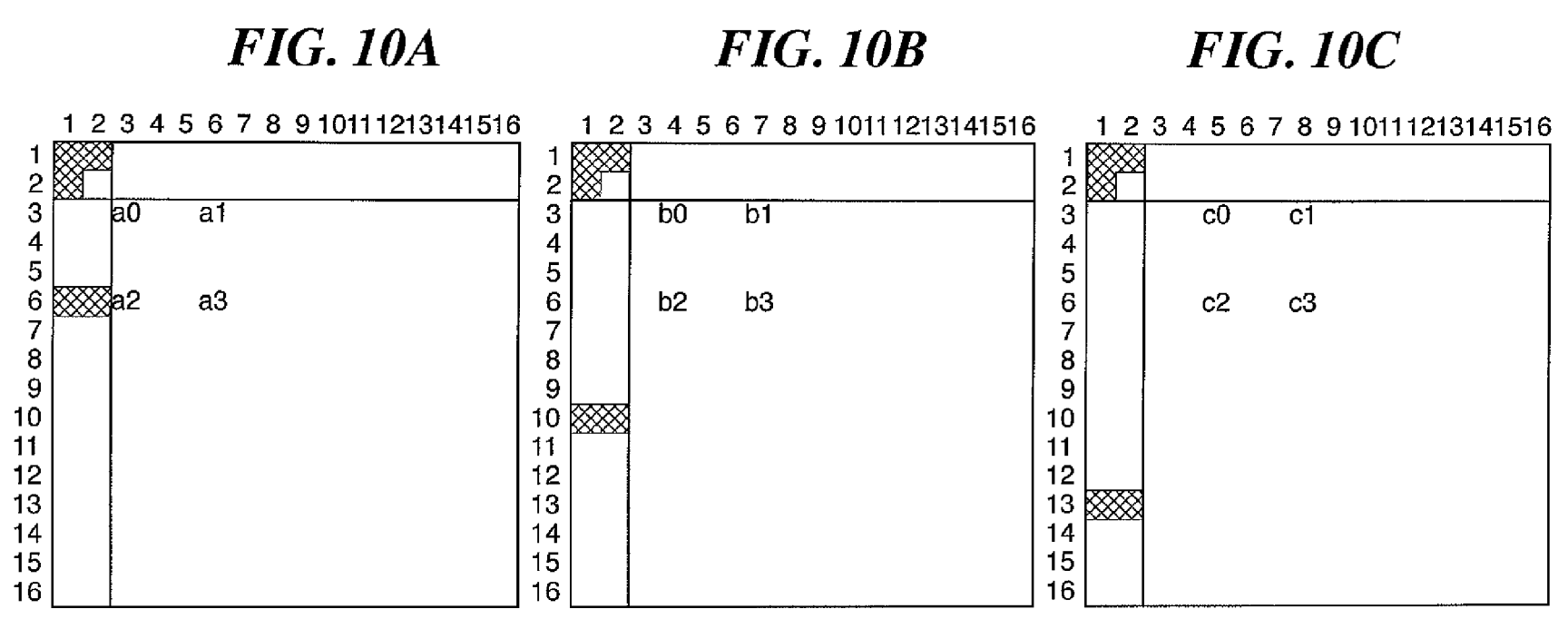
Figure 10D:
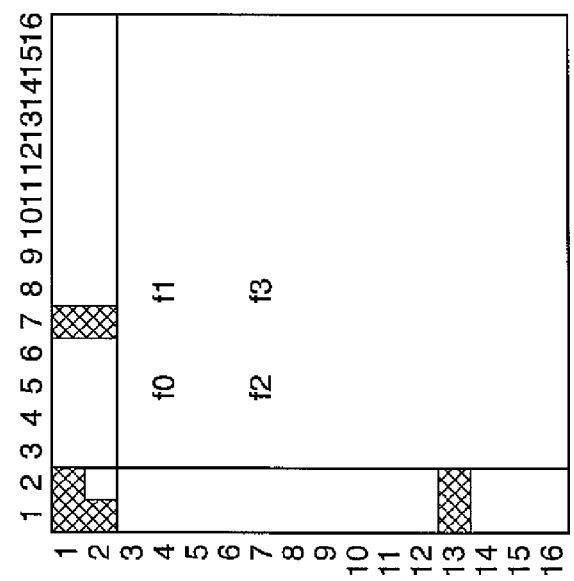
Figure 10E:
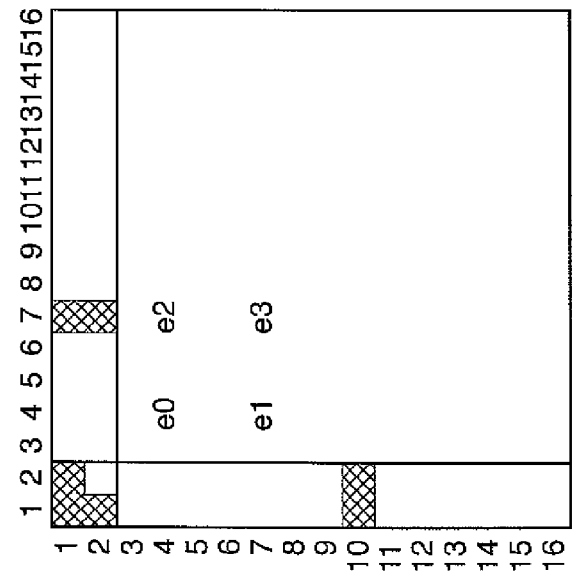
Figure 10F:
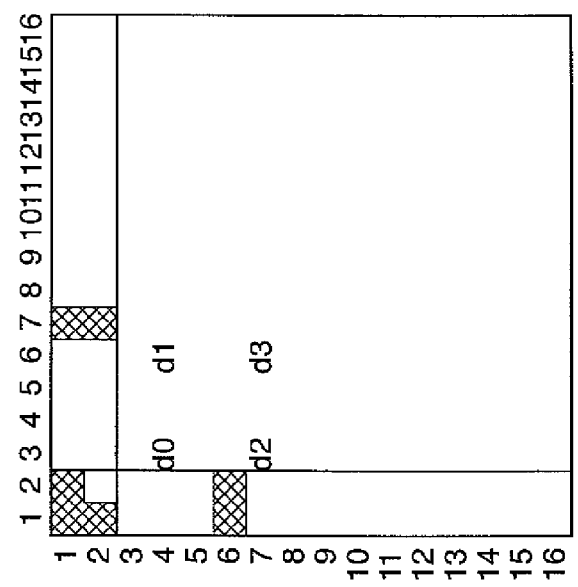
Figure 10G:
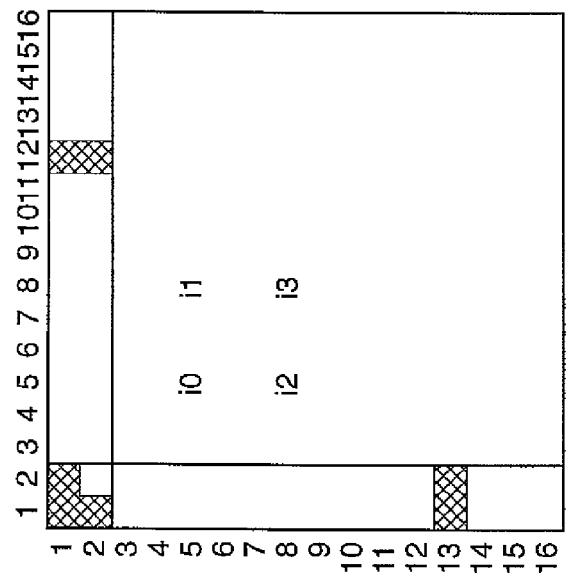
Figure 10H:
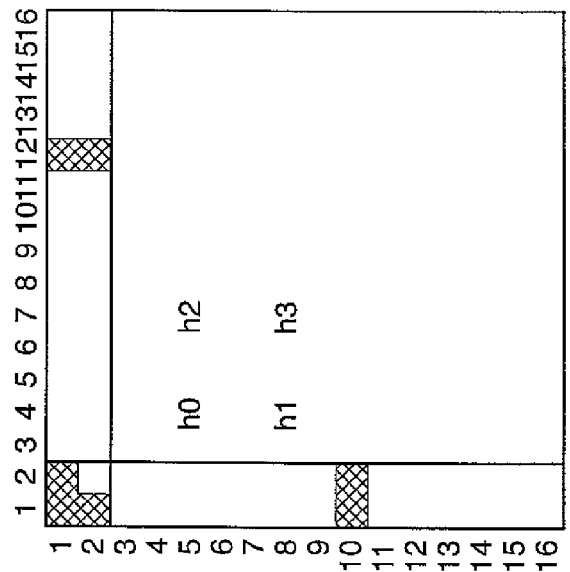
Figure 10I:
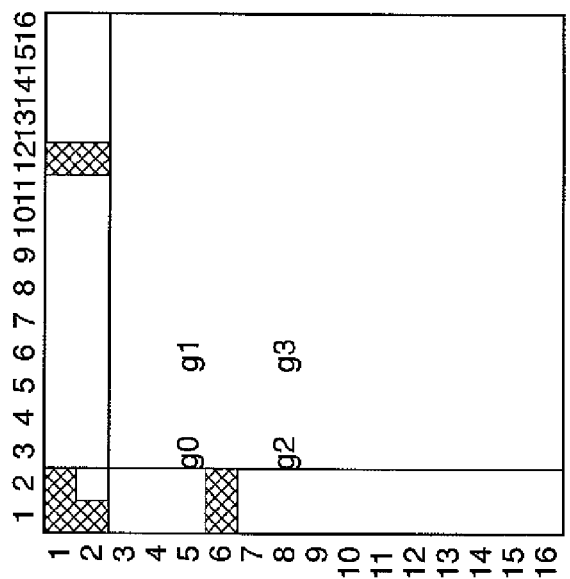

FIG. 10(A) shows the 16×16 pixel image at the top left corner of the 48×48 pixel image. The image of the 2×2 pixel at the top left corner of FIG. 10(A) indicates the orientation of the 16×16 pixel image. The 2 pixel image in the two left most columns in the 6-th low from the top indicates that the 16×16 pixel image is allocated to the left most row of the nine 48×48 pixel images. The lack of image (dots) in the 3rd and the subsequent columns in the top two rows indicates that the 16×16 pixel image is allocated to the top row of the nine areas in the 48×48 pixel image. Thus, it is indicated that the 16×16 pixel image in FIG. 10(A) is allocated to the left most column in the top row of the nine areas of the 48×48 pixels. In this way, which of the 16×16 pixel images in FIGS. 10(B) to 10(I) are allocated to which of the nine areas of the 48×48 image is indicated.

Returning to FIG. 8, the positions corresponding to addresses indicated with a in the image shown in FIG. 6 are allocated to the 14×14 pixel image in the 16×16 pixel image at the top left corner, excluding the two left most columns and the two top rows used for address determination. As shown in FIG. 8, the pixels corresponding to addresses a0, a1, a2, and a3 in FIG. 6 are allocated to addresses a0, a1, a2, and a3 in FIG. 8, respectively. By similarly dispersing the other pixels in FIG. 6, the image in which dots are dispersed as shown in FIG. 8 is created. If the principle of dispersing described above is known, the laser speckle pattern read from reflected light from the white plate can be accurately reproduced when an output image in which this image is embedded is read. Therefore, the laser speckle pattern can be used to track back to identify which image forming apparatus formed an output image.

Figure 11:
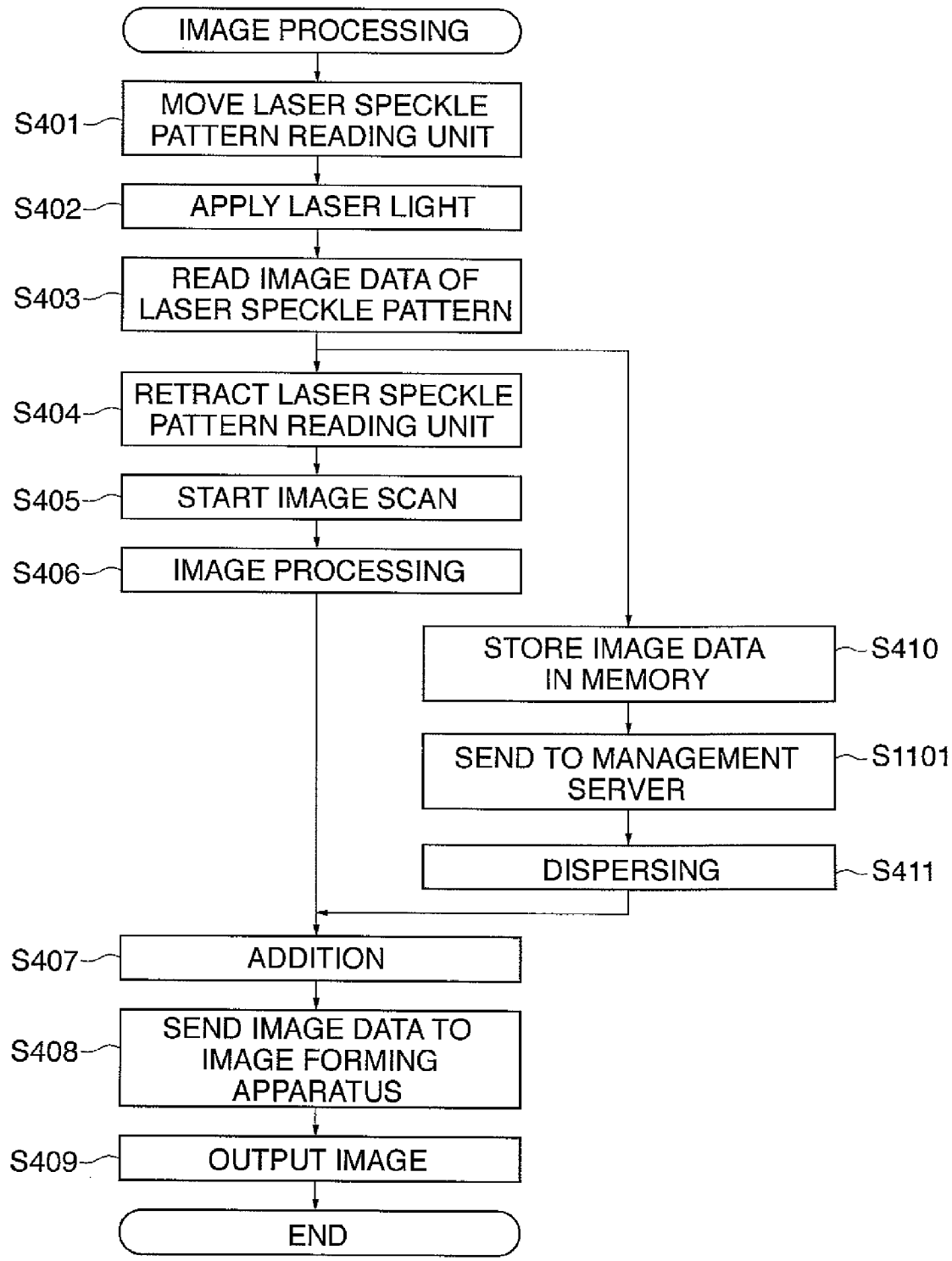
FIG. 11 is a flowchart of a process of a variation of the image processing shown in FIG. 4.

FIG. 11 is a flowchart showing a procedure of a variation of the image processing shown in FIG. 4.

The image processing shown in FIG. 11 is basically the same as the processing shown in FIG. 4. The same steps as those in FIG. 4 are labeled with the same reference numerals and redundant description of which will be omitted. Only the differences from the processing in FIG. 4 will be described below.

The processing shown in FIG. 11 differs from the processing in FIG. 4 in that step S1101 is inserted between steps S410 and S411.

In the image processing in FIG. 11, image data of a laser speckle pattern read at step S403 is binarized, the binarized image data is temporarily stored in a memory (step S410), and is then sent to a management server (step S1101).

Figure 12:
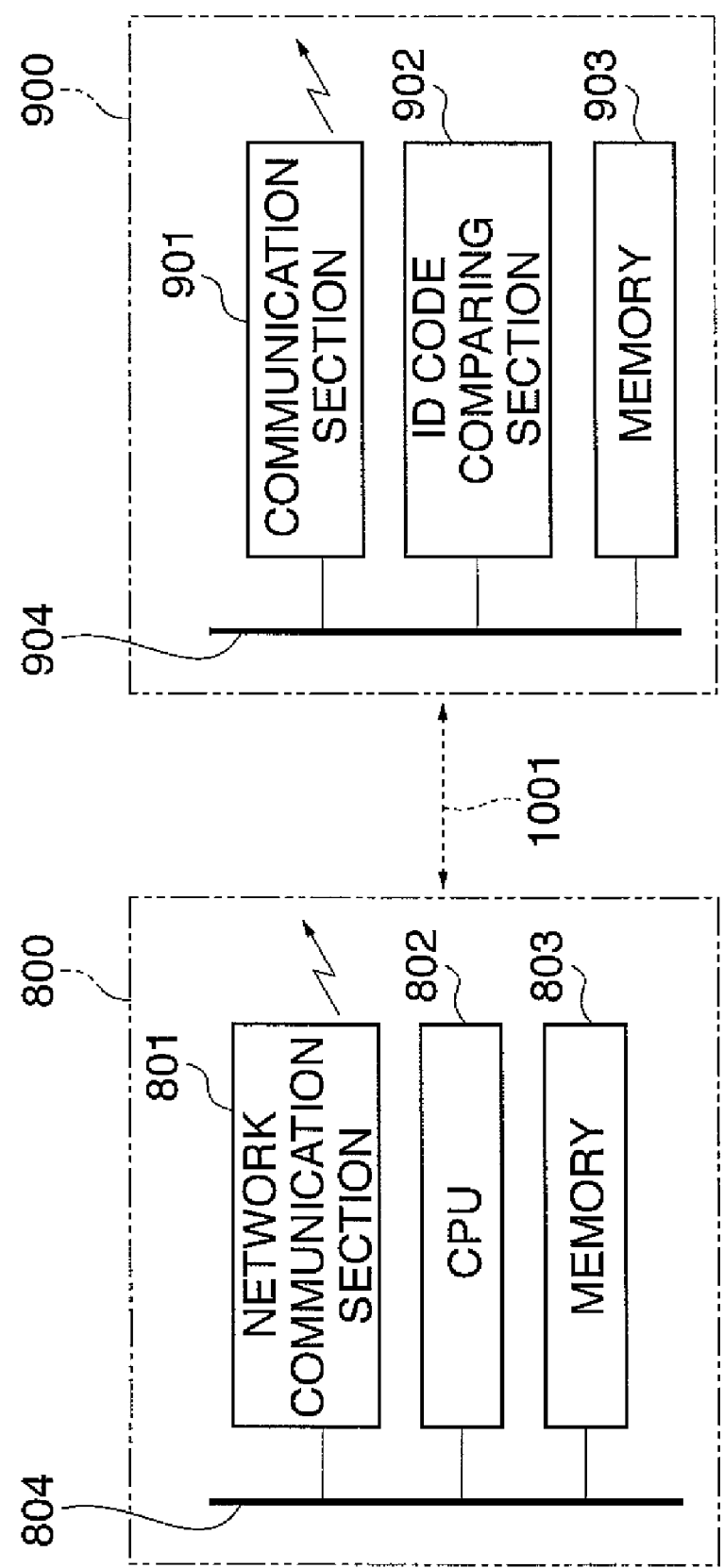
FIG. 12 is a block diagram schematically showing a configuration of a controller of an image forming apparatus performing the image processing shown in FIG. 11 and a configuration of a management server to which image data is sent in the image processing shown in FIG. 11.

FIG. 12 is a block diagram schematically showing a controller of an image forming apparatus that performs the image processing in FIG. 11 and the management server to which image data is sent at step S1101 of the image processing in FIG. 11.

The controller 800 in FIG. 12 controls input and output of image data to and from the image forming apparatus connected to a network 1001. Image data of a laser speckle pattern is stored in a memory 803 of the controller 800. The stored image data of the laser speckle pattern is sent to the management server 900 through a network communication section 801 in response to an instruction from a CPU 802 of the controller 800. The controller 800 and the management server 900 are interconnected through the network 1001 and are capable of bidirectionally communicating with each other all the time. The image data of the laser speckle pattern sent to the management server 900 is stored in a memory 903 in the management server 900 through a communication section 901. The stored image data of the laser speckle functions as ID data of the image forming apparatus that sent the image data. When the image data of the laser speckle pattern is obtained by scanning an image output from the image forming apparatus through use of a predetermined scanner, an ID code comparing section 902 in the management server 900 determines whether the laser speckle pattern image data read by the scanner matches the image data of the laser speckle pattern stored in the management server 900. By comparing an output image with the image data of a laser speckle pattern stored in the memory 903 in this way, determination can be made as to which image forming apparatus formed the output image.

Figure 13:
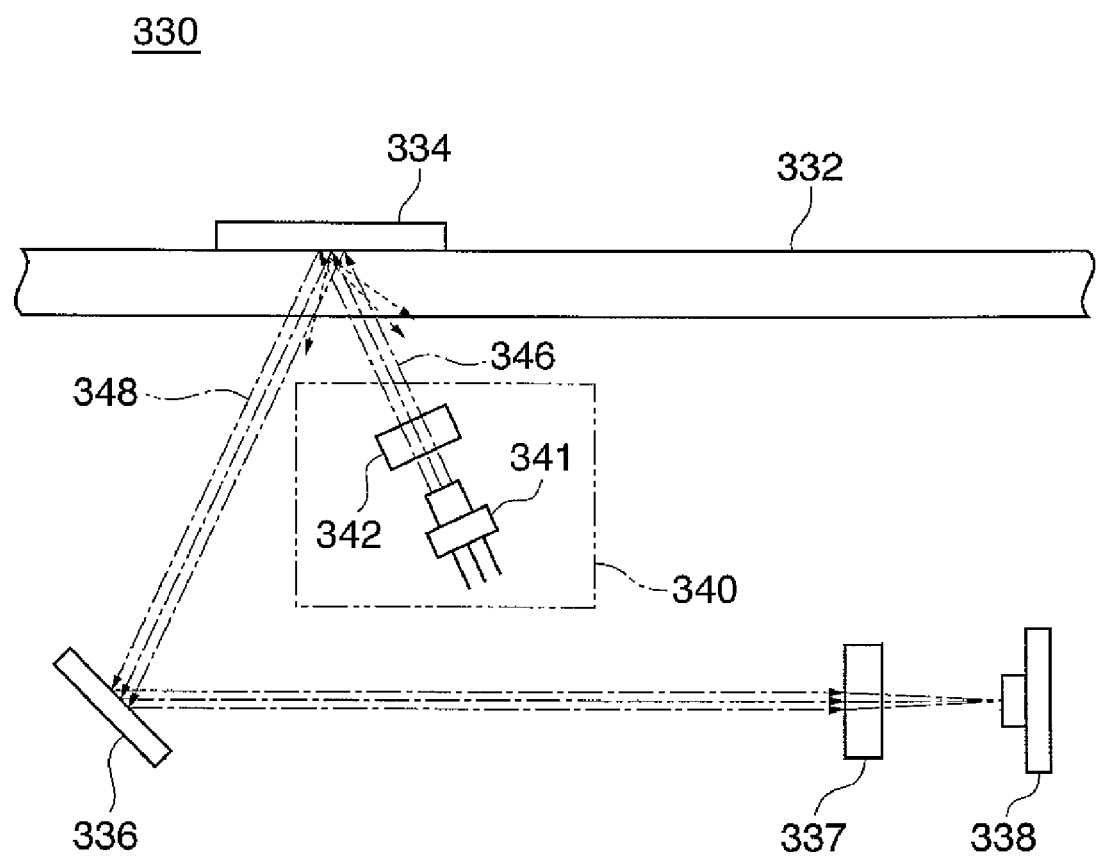
FIG. 13 is a diagram schematically showing a configuration of a variation of a feature part of the image reader shown in FIG. 2.

FIG. 13 is a diagram schematically showing a feature portion of a variation of the image reader 300 shown in FIG. 2.

The image reader 330 in FIG. 13 includes a platen glass 332 and a laser speckle patter reading unit 340. Provided on the platen glass 332 is a white plate 334 as a color reference plate.

The laser speckle pattern reading unit 340 includes a laser light source (irradiating section) and a collimator lens 342, and irradiates the white plate 33 with laser light 334. The laser speckle pattern reading unit 340 has a mechanism that moves the laser speckle pattern reading unit 340 to a position from where the white plate 334 can be irradiated with laser light 346 where the white plate 334 is to be irradiated with laser light 346, and retracts the laser speckle pattern reading unit 340 from the position when the white plate 334 does not need to be irradiated with laser light 346.

Laser light 346 applied from the laser speckle pattern reading unit 340 is parallel light produced by passing a laser beam emitted from the laser light source 341 through the collimator lens 342. The laser light 346 reached the white plate 334 through the platen glass 332 is reflected off microscopic asperities on the surface of the white plate that were produced during manufacturing. Reflected light 348 thus produced has a unique interference pattern known as the laser speckle pattern. The reflected light 348 from the white plate 334 is directed to a turning mirror 336 of an optical unit (reducing optical system) which is provided in the image reader 330 for reading an image of an original placed on the platen glass 332 with a CCD sensor 338 (reading section). The reflected light 348 turned by the turning mirror 336 reaches the CCD sensor 338 through an imaging lens 337 provided for the image reader 330 to read an image of an original placed on the platen glass 332. In this configuration, the CCD sensor 338 requires a light quantity reading element (not shown) having a wavelength sensitivity capable of sensing the wavelength of laser light. Whereas the image reader 300 described earlier and shown in FIG. 2 has reading elements for the three colors, R, G, and B, the image reader in this variation includes the light quantity reading element (which often uses infrared laser) capable of sensing the wavelength of laser light as a fourth color to read a laser speckle pattern of laser light. In this configuration, the turning mirror 336 must be moved in the scanning direction for reading two-dimensionally a laser speckle pattern produced by laser light reflected from the white plate 334, because the light quantity reading element provided in the CCD sensor 338 can read only a single line of an image at a time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-108042, filed Apr. 10, 2006, which is hereby incorporated by reference herein in its entirety.

What is claimed is:

1. An image processing apparatus comprising:
   an image reader having a reference plate and adapted to read image data of an original, the reference plate including a unique physical surface structure;
   an image forming section adapted to form an image on an image carrier based on the image data of the original;
   an irradiating section adapted to irradiate the reference plate with light; and
   a reading section adapted to read a pattern image generated by irradiating the reference plate with the light, the pattern image corresponding to the physical surface structure of the reference plate;

wherein said image forming section adds data concerning the pattern image read by said reading section to the image data of the original read by said image reader and forms an image based on the image data of the original to which the data concerning the pattern image is added.

2. The image processing apparatus according to claim 1, wherein said image forming section disperses the pattern image at predetermined spacing when the data concerning the pattern image is added to the image data of the original.

3. The image processing apparatus according to claim 1, wherein said image forming section forms the data concerning the image in yellow.

4. The image processing apparatus according to claim 1, wherein the image processing apparatus is connected to a server through a network and sending data concerning the pattern image read by said reading section to the server.

5. An image processing apparatus comprising:
- an image reader having a reference plate and adapted to read image data of an original;
- an image forming section adapted to form a color image on an image carrier based on the image data of the original, the reference plate including a unique physical surface structure;
- an irradiating section adapted to irradiate the reference plate with light; and
- a reading section adapted to read data on a pattern image of scattering light generated by irradiating the reference plate with the light, the pattern image corresponding to the physical surface structure of the reference plate;
- wherein said image forming section adds the data on the pattern image to the image data of the original and forms the color image based on image data of original to which the data on the pattern image is added.

6. The image processing apparatus according to claim 5, wherein said image forming section disperses the pattern in the data on the pattern image when the data on the pattern image is added to the image data of the original.

7. The image processing apparatus according to claim 5, wherein said image forming section adds the data on the pattern image to yellow image data in the image data of the original.

8. The image processing apparatus according to claim 5, wherein said reading section further reads the image data of the original.

9. The image processing apparatus according to claim 5, wherein said irradiating section irradiates the reference plate with the light immediately before the image data of the original is read.

10. The image processing apparatus according to claim 5, further comprising a memory adapted to store the data on the pattern image.

11. The image processing apparatus according to claim 5, further comprising a transmitter adapted to send the data on the pattern image to a server connected to the image processing apparatus through a network.

12. The image processing apparatus according to claim 11, wherein the data on the pattern image sent to the server is stored in a memory thereof.

13. A method of processing an image comprising the steps of:
- reading, by an image reader, image data of an original;
- forming, by an image forming section, an image on an image carrier based on the image data of the original;
- generating a pattern image by irradiating, with an irradiating section, a reference plate with light, the reference plate including a unique physical surface structure;
- reading, with a reading section, the generated pattern image, the pattern image corresponding to the physical surface structure of the reference plate;
- adding data concerning the pattern image to the image data of the original; and
- forming an image based on the image data of the original to which the data concerning the pattern image is added.

* * * * *